June 26, 1962 L. O. PARKER 3,040,740
PREFABRICATED PAD FOR SURGICAL CASTS AND THE
LIKE AND METHOD FOR MANUFACTURING THE SAME
Filed Nov. 20, 1957 7 Sheets-Sheet 1
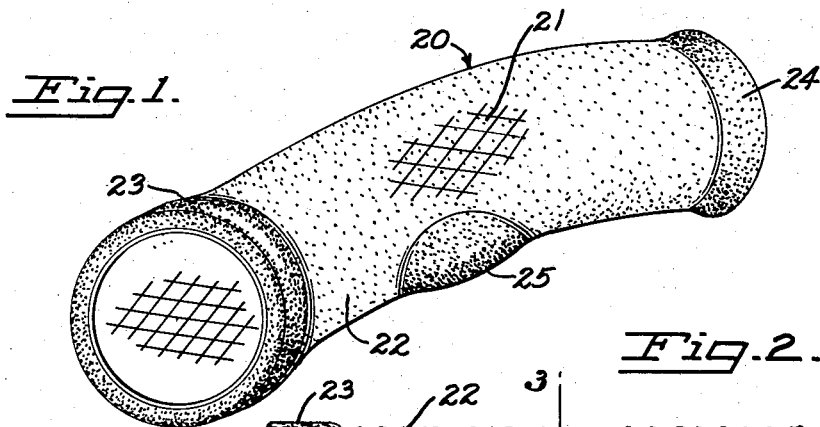
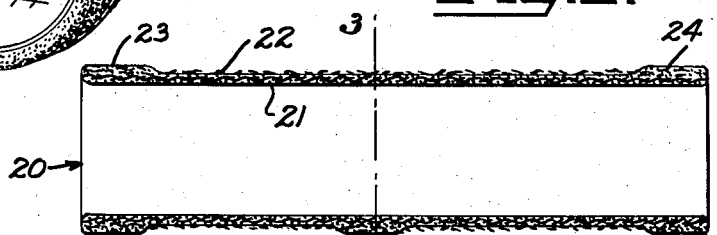
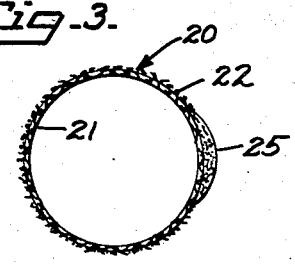
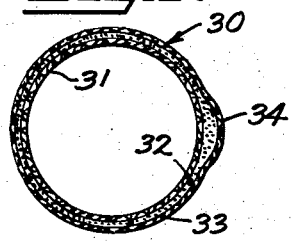
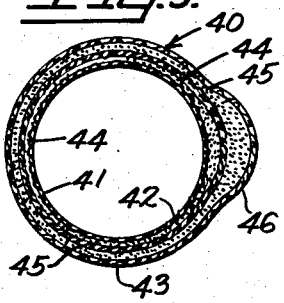
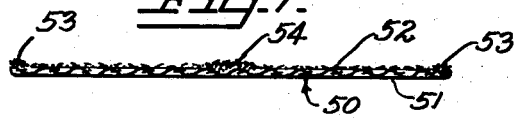
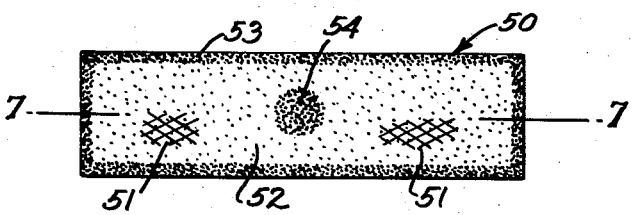
INVENTOR.
LEON O. PARKER
BY
ATTORNEY

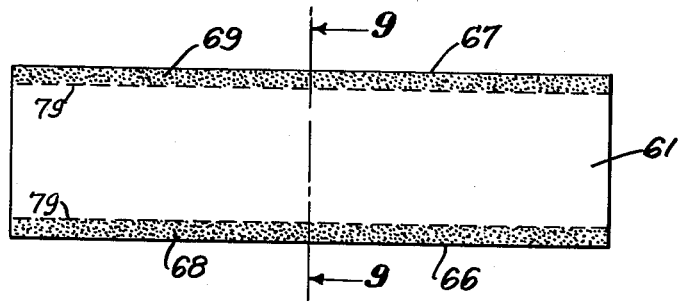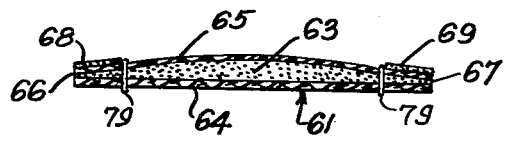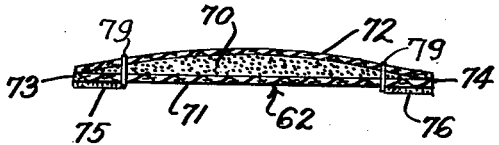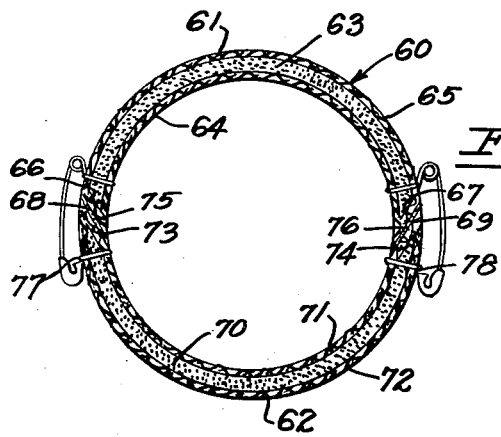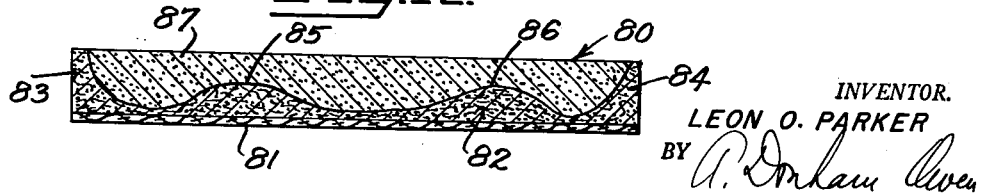

June 26, 1962  L. O. PARKER  3,040,740
PREFABRICATED PAD FOR SURGICAL CASTS AND THE
LIKE AND METHOD FOR MANUFACTURING THE SAME
Filed Nov. 20, 1957  7 Sheets-Sheet 3

INVENTOR.
LEON O. PARKER
BY
ATTORNEY

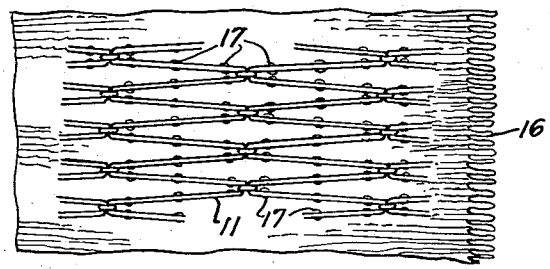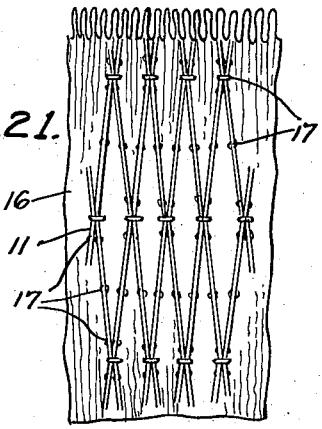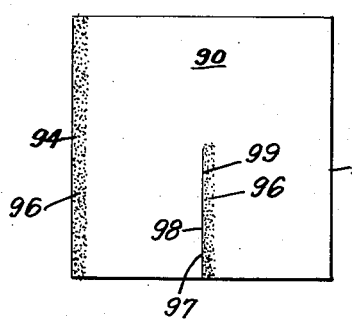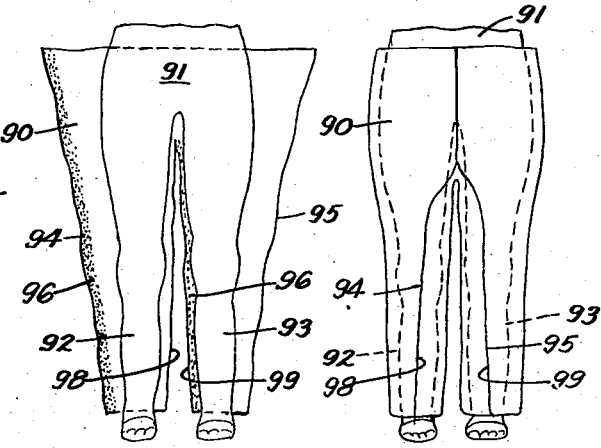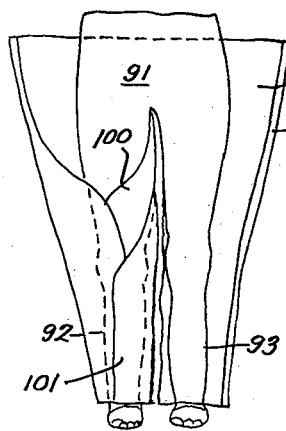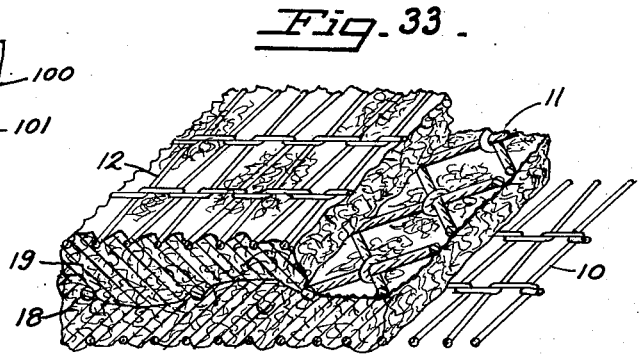

June 26, 1962 L. O. PARKER 3,040,740
PREFABRICATED PAD FOR SURGICAL CASTS AND THE
LIKE AND METHOD FOR MANUFACTURING THE SAME
Filed Nov. 20, 1957 7 Sheets-Sheet 5

INVENTOR.
LEON O. PARKER
BY
ATTORNEY

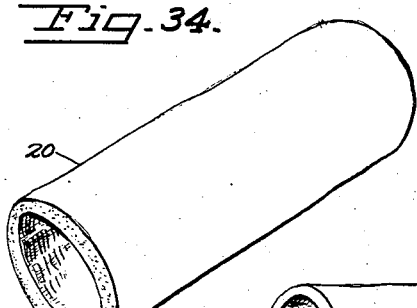
Fig. 34.
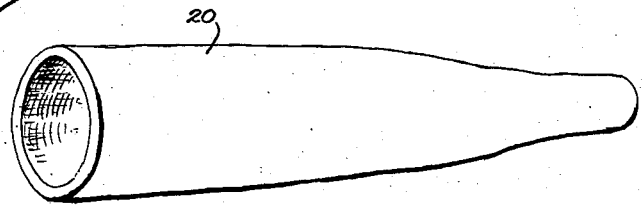
Fig. 35.
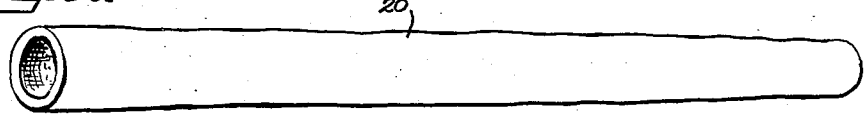
Fig. 36.
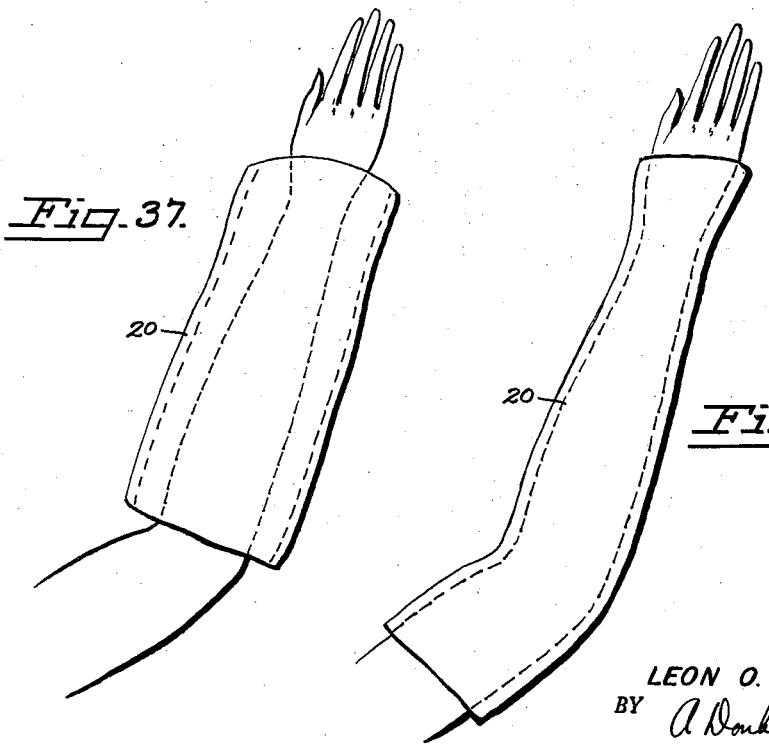
Fig. 37.
Fig. 38.
INVENTOR.
LEON O. PARKER
ATTORNEY

INVENTOR.
LEON O. PARKER
BY
ATTORNEY

United States Patent Office 3,040,740
Patented June 26, 1962

3,040,740
PREFABRICATED PAD FOR SURGICAL CASTS AND THE LIKE AND METHOD FOR MANUFACTURING THE SAME
Leon O. Parker, San Francisco, Calif., assignor to San Francisco Research Corporation, San Francisco, Calif., a corporation of California
Filed Nov. 29, 1957, Ser. No. 698,024
31 Claims. (Cl. 128—83)

This invention relates to a prefabricated surgical dressing or pad that is adapted for application around or over parts of the human body, and is suitable for encasement in a plaster cast or the like. This application is a continuation-in-part of applications Serial No. 325,001, filed December 9, 1952, now Patent No. 2,960,984, and Serial No. 412,252, filed February 24, 1954, now abandoned. Serial No. 325,001 was a continuation-in-part of application Serial No. 248,065, filed September 24, 1951 and now abandoned. Serial No. 412,252 was a continuation-in-part of Serial No. 251,203, filed October 13, 1951 and now abandoned.

Although the pad of this invention is not confined to used with plaster-of-Paris casts, its application there illustrates many of the problems solved by the invention. Plaster-of-Paris casts are used universally for splinting of fractures and dislocations, burns, operations requiring splinting, and some cases of paralysis. The bare plaster-of-Paris is too rigid to accommodate swelling and is both dangerous and uncomfortable; therefore, padding or dressing is almost universally required under certain types of casts to accommodate swelling, protect the tissues from the cast material, and to absorb the drainage from open wounds.

Heretofore, the padding or underdressing, like the cast itself, had to be built up piece-by-piece on the patient, the dressing or padding being built up first and the cast being built on top of it. Small pieces of padding were laid on, or narrow strips of padding were wound on tediously, even in military surgery where large numbers of casualties needed to be handled rapidly. Furthermore, for large body casts, this method required a fracture table to suspend the patient during the building up of the pads and casts. The time consumed building the pad and cast, and the fact that fracture tables are scarce and are difficult to transport unduly delayed early and proper treatment of many casualties.

The old piece-by-piece and wind-on paddings also endangered patients by irregularities in tension and by constricting bands passing around the body or extremities. Where the padding was drawn too tightly, constriction occurred and where it was too loose, swelling occurred in the loose pocket. There was also difficulty with the loose pieces moving about under the cast, especially at the edges, resulting in poor protection. Furthermore, irregularity on the surface of the dressings tended to produce a corresponding irregularity on the inner surface of the cast.

Finally, when these prior-art casts were removed, the loose pieces of padding tended to fall apart instead of remaining in place and had to be built up again if the cast needed to be replaced. During removal of the cast, they tended to catch in the jaws of the plaster cutter, or if an oscillating saw was being used, the padding tended to slip and not give the patient's skin proper protection from the saw.

The objects of the present invention are to solve the above problems and some others by providing a new padding material which can be cut into a unitary prefabricated pad or dressing in a convenient or in a standard size and can be stretched or distorted to fit the body part at the time of application of the cast. The pads can be made flat and wound about the patient, or they can be made prefabricated in tubular form and applied to fit by virtue of their great stretch and distortability. Only a few standard sizes need be made.

In general, it may be said that the pad of my invention is characterized by its employment of a base or skeleton of stretchable fabric and a stretchable padding material supported on the base. By "stretchability" I mean adaptability, not mere elasticity. The entire article is so constructed that, when it is stretched in one direction it will contract in the direction normal thereto. This is what enables its conformation to the peculiarities of an individual body member, and this stretch ability is by virtue of the loose constitution of the threads in the fabric, regardless of whether the threads themselves are inelastic or elastic.

Any excess length may be taken up in width; or excess width may be taken up in length, and then may be folded back over the end of the cast as an added protection to the skin in this area or may be cut off.

My new prefabricated pad or dressing can be applied very rapidly, and its application does not involve any of the difficulties that characterized the prior art. Its edges are regular, and the pressure is uniform; so the patient is protected against such former troubles as strangulation of veins, body-swelling into loose pockets in the cast, and undue roughness on the cast interior. Very little skill is required to apply my new pad or dressing and application takes far less surgical or anaesthesia time than prior art pads did. Moreover, my new pad is easier to apply in a sterile condition, because it is a unitary article and because it does not require all the handling necessitated by a custom-made cast.

A further advantage of my new pad is that, when removing a cast that has been put over one of my prefabricated pads, there are no free loose edges of the padding to catch in the plaster cutter, as was always happening in the prior art. In addition, the padding tends to remain in place in the cast even after the cast has been removed, whereas prior art pads used to get out of place and ruffle up. Because my new pad does remain in place, the removed cast may easily be put back on the patient with the padding intact, and the pad is more even and safer after replacement than was a new pad constructed according to the prior art. Prior-art pads could not be as evenly and safely replaced.

Other advantages and additional features of my invention will appear from the following illustrative description and accompanying drawings, presented in accordance with 35 U.S.C. 112. However, it is not intended to limit the invention to the illustrative details, the scope of the invention being defined by the appended claims.

FIG. 1 is a view in perspective showing a prefabricated tubular pad embodying the principles of the invention.

FIG. 2 is a view in longitudinal section of the tubular pad of FIG. 1.

FIG. 3 is a view in cross section taken along the line 3—3 of FIG. 2.

FIG. 4 is a view similar to FIG. 3 showing a modified form of tubular pad.

FIG. 5 is a view similar to FIGS. 3 and 4 showing another modified form of tubular pad.

FIG. 6 is a top plan view of a prefabricated flat pad embodying the principles of the invention.

FIG. 7 is a view in section along the line 7—7 in FIG. 6.

FIG. 8 is a top plan view of a modified type of pad used to form a prefabricated seamed pad.

FIG. 9 is a view in section taken along the line 9—9 in FIG. 8.

FIG. 10 is a view similar to FIG. 9 showing a matching pad which is combined with the pad of FIGS. 8 and 9 to form the tubular seamed pad shown in FIG. 11.

FIG. 11 is a view in section showing the strips of FIGS. 9 and 10 joined together to form a seamed padded sleeve.

FIG. 12 is a diagrammatic view in section showing a portion of a cast built up on a prefabricated pad, where the thickness of the plaster and of the padding are varied internally to give a cast having a substantially uniform over-all thickness.

FIG. 20 is a plan view of a pre-stretched piece of netting with a crinkled paper-type pad lightly glued thereto at discrete spots.

FIG. 21 is a plan view similar to FIG. 20 with the base and padding stretched in the opposite direction.

FIG. 22 is a plan view of a large prefabricated pad adapted to cover the lower half of a human body, having a split portion and adhesive spots along its edges.

FIG. 23 is a plan view of the prefabricated pad of FIG. 22 placed under the body to which it is to be applied and stretched out to conform generally to the shape thereof.

FIG. 24 is a plan view of the prefabricated pad of FIGS. 22 and 23 placed around the body and conformed thereto and adhesively secured together.

FIG. 25 is a plan view showing the installation of a pad similar in shape to the pad of FIGS. 22–24, but having no adhesive on its edges, the installation being made at the same time and along with a stretchable prefabricated cast of the same shape, the pad being laid directly over the cast, and the cast being put together immediately after overlapping the pad, so as to hold the pad together.

FIG. 27 is a view in elevation and partly in section of a form, generally resembling a human leg, with about half of an overlength fabric tube fit snugly around it, the remainder of the tube hanging free from the form.

FIG. 28 is a view similar to FIG. 27, showing the over-length tube portion brought partway up the form, around itself, with padding particles being filled in between the two layers.

FIG. 29 is a view similar to FIG. 28 showing the completed pad still on the form.

FIG. 30 is a view showing the pad rolled up, as a stocking is rolled, for shipment, storage and handling.

FIG. 31 is a view in elevation and in section showing the pad of FIG. 30 being applied to a human leg. The rolled pad is being stretched somewhat as it is slipped over the foot.

FIG. 32 is a view similar to FIG. 31 showing the pad unrolled up the leg and almost fully applied.

FIG. 33 is a view generally similar to FIG. 13 showing a pad made up of cotton batting entangled with fish net and surrounded by knit fabric.

FIG. 34 is a view in perspective of a tubular prefabricated cast similar to that of FIG. 1 shown extended in its diameter and circumference and contracted in its length.

FIG. 35 is a view in perspective of the same tubular prefabricated pad as that shown in FIG. 34 with a portion extended in length, with the resultant decrease in diameter and circumference in that portion.

FIG. 36 is a view in perspective of the same tubular prefabricated pad as shown in FIGS. 34 and 35, in which the entire tubular pad has been extended in length, with the resultant contraction in diameter and circumference throughout.

FIG. 37 is a view in perspective of the prefabricated tubular pad of FIGS. 34 through 36 re-extended in circumference and diameter and recontracted in length and applied around the forearm of an arm.

FIG. 38 is a view similar to FIG. 37 of the same pad shown extended in length and contracted in circumference and diameter so as to fit the forearm and elbow at all points without wrinkling.

Figure 13:
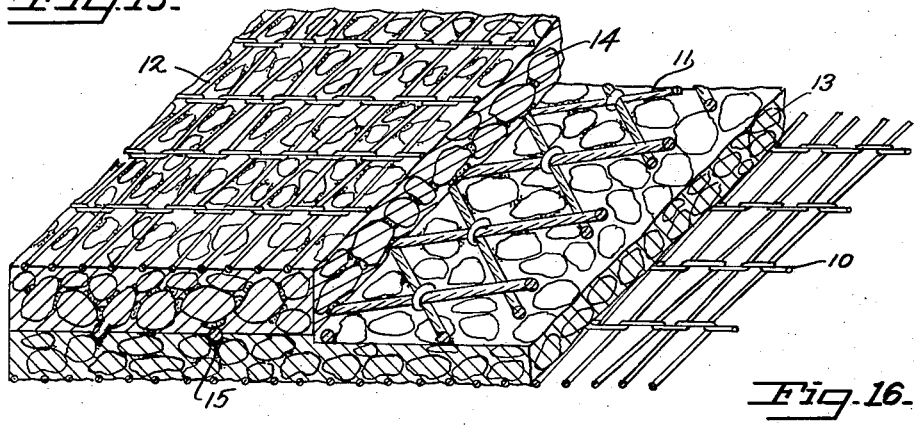
FIG. 13 is an enlarged view in perspective and partly in section, with parts broken away progressively, of a portion of a pad having two layers of divided padding material between two outer layers of knit material and an inner layer of netting, the padding material being glued in discrete spots to the netting.

The prefabricated pad illustrated in the above drawings includes two essential members: a skelton or base, and padding material held thereon.

*The Base or Skeleton Material*

(See FIGS. 14–19)

Preferably the skeleton or base is fabric. An important feature of the invention is the use of a skeleton or base that is stretchable, but not because of elasticity like a rubber band or rubber pad, though elasticity can be present as an additional feature. My fabric skeleton is stretchable in the sense that when such a fabric is stretched in one direction, the base gains in length and loses in width; when stretched in the other direction, the base gains in width and loses in length. By alternately stretching and contracting the skeleton, the pad can be quickly and accurately conformed to an individual body member.

Many fabrics have the desired stretchy characteristics, although the gauze or crinoline bandages and woven cloth tapes are unsuitable for many uses, because they are too rigid; their threads run parallel to and perpendicular to their edges and the threads do not slide on each other where they cross. Many knit fabrics are suitable, and so are nets when arranged to be stretched on a bias, especially nets with openings considerably wider than the threads of the net. The properties of the base or skeleton can be varied by choosing different fabrics or by using two or more different fabrics in combination, all of them having these stretching properties, but in varying degree (see FIG. 13). For example, finely knit fabrics and close-meshed nets generally have less stretch than coarsely knit fabrics and wide-meshed nets of the same general construction.

In general, the stretchable fabrics may be referred to as loosely-constituted thread type cloth, this term including loosely knit cloth, loosely woven cloth, and loose nets, the threads of the latter two being arranged on a bias for stretch along the major dimensions of the article. The term "stretchable fabrics" refers to fabrics that are stretchable a substantial, large amount, not the relatively small, sometimes inconsequential amount that any fabric will stretch.

It should be understood, however, that the stretch referred to above is not mere extension, for there is the corresponding contraction in the direction perpendicular to the direction of pull. Material that gets soggy or mushy when wet and that tends to act in such a way that, once stretched its former dimensions cannot be regained—such material is not suitable for use in this invention. For example, sheets of felt and cotton batting tend to pull apart and to remain so; they do not respond sufficiently to crosswise pull, and they do not regain their original shape. Therefore, they are usually unsatisfactory. The additional fact that they do not expand enough when pulled is bad enough, but their inability to be conformed by being reduced in size after being pulled out, is their more important failure. However, cotton batting may be used as padding if adapted as in FIG. 33 to conform to a stretchable fabric. It is not capable of itself being the fabric base.

It is true that any material may be stretched somewhat, but in order to practice the present invention a really substantial change in dimensions is needed—a marked ability to expand and contract under pull. As a minimum amount, the material should be extendible about 25% in each dimension, as compared with a midway position. For example, a piece of material that was 4" x 4" square would have to be expandible to about 5" x 3" in pull in one direction, and to about 3" x 5" when pulled transversely, the area remaining the same. Actually, the base may expand and contract much greater than this, but it should not generally be less. If its "normal" position, as manufactured, means a greater stretch in one direction than in another direction, the maximum stretch in one direction may be less than 25%, if there is enough stretch in the other direction to make up a substantial equivalent of total stretch. Thus cotton print cloth is generally unsuitable because it is not stretchable to anywhere near this degree, even when cut on a bias with respect to the shape of the base. On the other hand, crinoline and gauze may, for some uses, by satisfactory if (and only if) they are of wide mesh and are cut on a bias. Gauze or crinoline bandage material, as normally cut, is not expandable to any degree along the major dimensions; and so it could not be used as normally cut. Where the meshes of a net or of woven goods are larger than the threads, they are usually distortable about 33⅓% in each direction, when on a bias.

As intimated above, the cloth fabric should be of the thread type and should be loosely constituted. Loosely knit material, such as loose tubular jersey, stockinet, and similar materials, may be used, so long as the threading may slip loosely over itself. The spacing of the threading so that the meshes are relatively wide, helps make knit material stretchable in the way required by this invention. Loose netting, such as fish-net, may be used, if placed on the bias, and it is a strong material. Loosely woven material may also be used if placed on the bias.

For purposes of clarity, some of the terms used in the claims will be defined: A skeleton which is suitable, as explained above, will be denominated in such language as "a loosely-constituted thread-type cloth." As stated elsewhere the cloth is "arranged for a substantial amount of extension along either of its major mutually perpendiclar dimensions." Preferably it should contract simultaneously along the other major dimension.

Figure 14:
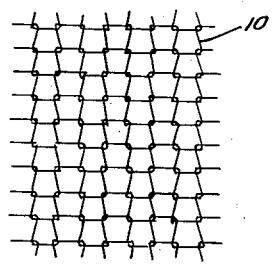
FIG. 14 is a plan view of a loosely knit type of fabric suitable for use as a base or skeleton for the prefabricated unitary pad.
Figure 15:
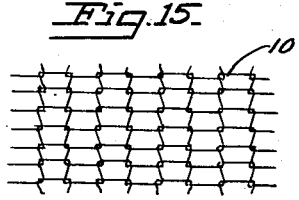
FIG. 15 is a plan view of the fabric of FIG. 14 stretched widthwise, showing how it extends widthwise and simultaneously contracts in length.
Figure 16:
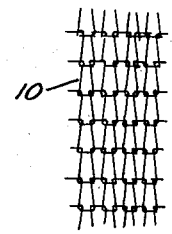
FIG. 16 is a plan view of the fabric of FIG. 1 stretched lengthwise, showing how it then contracts in width.
Figure 17:
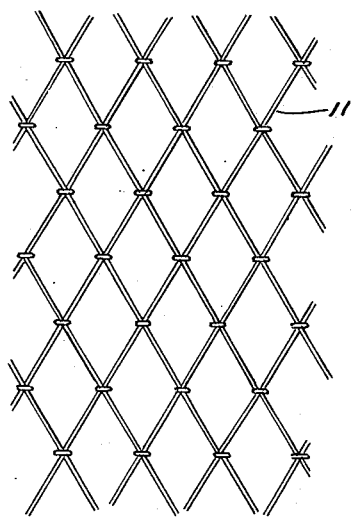
FIG. 17 is a plan view of a base or skeleton made from a net placed along a bias.
Figure 18:
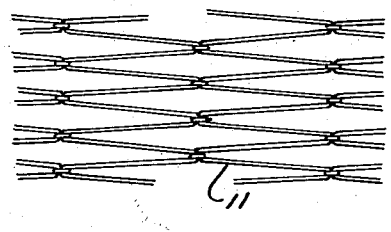
FIG. 18 is a plan view of the net of FIG. 17 stretched on the bias in one direction and thereby contracted in the other direction.
Figure 19:
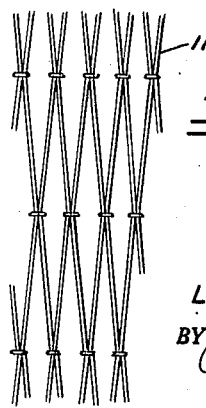
FIG. 19 is a plan view of the net of FIGS. 17 and 18 stretched on the bias in the other direction from FIG. 18.

Two suitable fabrics are illustrated diagrammatically in FIGS. 14–19. FIGS. 14–16 show a knit fabric 10. When stretched in width (see FIG. 15), it contracts in length and vice versa (see FIG. 16). FIGS. 17–19 show a net 11 arranged on a bias. When stretched, it is extended in one direction, and at the same time, it is contracted in the other direction (see FIGS. 18 and 19).

As an example, one knit skeleton which I found satisfactory was a tubular knit piece with about twelve threads to the inch when it was in its normal condition, i.e., not stretched in either direction, when the meshes were almost square, as shown in FIG. 14. When this tube was stretch to its maximum length it was thirty-six inches long and four and one-half inches in circumference. When it was stretched to its maximum circumference it was ten inches long and twenty inches in circumference.

Another knit tube was of stockinet, ten threads to the inch in each direction. When stretched out lengthwise, it had seven threads to the inch along its length and thirty-four threads to the inch along its width. When stretched widthwise, it had thirty-four threads to the inch along its length and seven threads to the inch along its width. The circumference of the tube will then be varied by stretch from twelve inches to fifty-eight inches.

Another circular knit fabric tested and used satisfactorily could be varied by stretch from fourteen inches, as manufactured, to seventeen inches in one direction, and from twelve inches, as manufactured, to forty inches in the other direction. This particular material weighed about twenty-six grams per square yard.

Either grey goods or boiled and bleached cloth can be used, but the latter is preferable in most instances. In some cases, where the threads tend to become soggy or are otherwise affected adversely by wetting, the threads may be waterproofed, as by dipping the threads in paraffin before or after the cloth is woven, knit or netted.

I have found that such stretchable fabrics maintain their ability to stretch when they are filled with or embedded with certain types of padding and even when they also support wet unset plaster-of-Paris—up until the plaster sets. When plaster or other cast-forming material is applied over my new pad, and the cast sets and becomes rigid, the under padding retains its desirable softness and compressability, though its outer surface adheres to the cast. This novel pad is especially well adapted for use with my novel prefabricated cast-forming article, described in application Serial Number 325,001, filed December 9, 1952.

The loosely-constituted thread-type cloth made of inelastic threads had extendibility and contractability with a stay-putness, so that the pad can be conformed to major shape changes by pulling it to the shape needed, there being a simultaneous contraction along the dimension perpendicular to the pull. The cloth can be pulled back and forth in either major dimension, as desired, and it will still retain the same general area. This quality makes the pad adjustable to irregularities and peculiarities of shape, so that a smooth and even fit can be obtained, free from wrinkles and free from undue pressure over enlarged areas, and the pad is also compressible into cavities.

For some purposes, the threads of this loosely-constituted thread-type cloth may be elastic in themselves. Such threads may be made from rubber or may be made elastic by the way in which they are spun. Such a fabric has extendibility when pulled, both because of its elasticity and because of the stretchability already discussed at length. With such threads, woven fabric may be used without cutting it on the bias. Furthermore, such fabric can be stretched to have an increased general area. By choosing threads from the wide range of elasticities available, the fabric may thus be given more or less elasticity as desired. In this connection, FIGS. 18 and 19 may be considered either as enlarged views of net made from inelastic threads or as unenlarged views of net made from elastic threads.

These stretch effects make is possible to fit any part of any size of the human body with a relatively few standard sizes of the prefabricated padded member. E.g., there may be small, medium, and large sizes for the different limbs and body members of children, and small, medium and large sizes for adults.

The Padding Material

The padding material is preferably some soft substance of a type that is moldable or stretchable without becoming damaged. It may, for example, be divided paper pulp, which will stretch without fracturing when wet, or it may be shredded cellulose fibers, shredded rags, shredded wool, shredded glass fiber, divided or shredded sponge or foam rubber or subdivided felt particles all of which are satisfactory wet or dry. The shredded particles may be between 1 mm. and 1 cm. in diameter, and with some materials they may be made larger; other materials may be used as a substantially continuous sheet.

When the padding material is composed of small particles, masses of the particles may be floated in, blown in, sucked in, or placed on the fabric by some mechanical means, and they may be lightly glued to the fabric and somewhat to each other, very lightly (FIG. 13), or they may be held by their own properties of adhesion and cohesion. At any rate, they will adhere to the fabric and do so at discrete spots, because they are themselves discrete. They should not be permitted to stick to each other to the extent that they become a homogeneous mass. In some cases, the particles may stretch satisfactorily only when they are wet, as is the fact with paper pulp. In other instances they may be stretched safely either when wet or dry. Any material that is properly stretchable when wet may be placed against wet plaster-of-Paris (e.g., my prefabricated cast of application S.N. 325,001, after it has been wet) for application to the patient's body as a unit.

The padding material may come in continuous sheets or strips of inelastic material that is stretchable or extendible, such as loosely fabricated crinkled paper, its crinkling permitting its extension without fracture until straightened out. Crinkled absorbent cellulose may also be used. Such a sheet or strip may be lightly glued or otherwise secured to the fabric at a large number of discrete spots, but not by a continuous layer of glue.

FIGS. 20 and 21 show the operation of crinkly sheet material. In FIG. 20 netting 11, pre-stretched as in FIG. 18, has a sheet 16 of crinkled paper or crinkled Cellucotton lightly glued to it at discrete spots 17. The crinkled sheet 16 is compressed in the same direction in which the netting 11 is contracted. Then, when the netting 11 is extended in the opposite direction (FIG. 21) the crinkled sheet 16 becomes extended along with the netting, uncrinkling in that direction. At the same time, the contraction of the netting 11 in the opposite direction causes the sheet 16 to become crinkled in the new direction, because of the spots of glue 17.

If desired, the particles or other padding may be waterproofed with oil, paraffin, or some other type of waterproofing. Waterproofed particles, made from ordinary sheet wadding (Cellucotton long used in rolls for padding under a cast), in a size up to about one cubic millimeter, may be combined with about 10% paper pulp. When this combination is placed between nets, it is stretchable and moldable when wet, and it dries easier and gives a better padding than unwaterproofed particles that have been subjected to moisture, as by contact with wet plaster.

The padding material is preferably placed over the fabric so that an innermost fabric layer will always lie next to the skin, because when the padding is on the skin side, it sometimes tends to ruffle and become bumpy.

Example of a Simple Tubular Pad (FIGS. 1–3)

The pad 20 shown in FIGS. 1–3 is a tubular sleeve, made from a stretchy fabric tube 21 (which may be made from the knitted material 10, netted material 11, or other suitable fabric) having particles of padding 22 secured thereto at discrete spots, as by gluing, by floating in, or by some other method. The pad 20 may be made with the padding 22 uniform in thickness or with heavily padded portions 23 and 24 around each end and another heavily padded central portion 25 at about the center, to protect some bone or similar bodily prominence or protrusion.

The padded sleeve 20 may be applied as a tubular padding around some body portion by first stretching it in diameter or circumference at the expense of its length, so that it may go over the largest parts of the body portion. After it has been put over these large parts, it may be pulled in length, so that it will be constricted in diameter or circumference until it is properly fitted around the body member. It will stay put, and the tension will be substantially uniform.

Example of a Tubular Pad With Two Layers of Fabric and Padding in Between (FIGS. 4 and 27–32)

FIG. 4 shows a modified form of tubular pad 30 in which the padding 33 is secured between two fabric nets or knit tubes 31 and 32. Again, for illustrative purposes only, a thickly-padded portion 34 is shown. Of course, there need not be such a portion, or it could be located elsewhere. The application and use of the pad 30 are similar to those of the pad 20.

Figure 27:
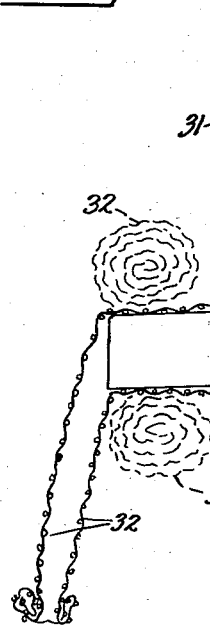
FIGS. 27 to 32 illustrate how a leg pad may be manufactured from a knit fabric tube and divided padding particles and how the pay may then be compressed for storage and shipment and later applied to a leg.
Figure 28:
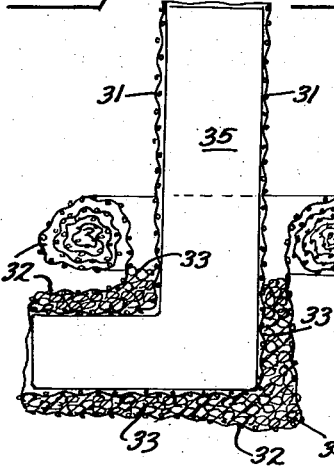

In manufacturing a prefabricated tubular pad 30, a rigid form 35 (see FIG. 27) simulating the human part for which a pad 30 is to be made, may be covered with a tubular piece 31 of the desired fabric, either knit fabric 10 or net material 11 on the bias as shown here. The second layer 32 of fabric may be an overlength portion of the knit tube 31, as shown in FIG. 27, or may be a separate tube. In either event, it may first be rolled up as a stocking is rolled and then unrolled around the form 35, surrounding the piece 31. While this outer layer 32 is being unrolled up the form 35 (FIG. 28), the padding 33 may be filled in between the layers 31 and 32. The padding 33 may consist of discrete particles of soft material, as shown here, or it may consist in some areas of sheets of stretchable material like absorbent cellulose, or crepe paper, adhered to the fabric in discrete spots (as in FIGS. 20–21). The padding material may be either sifted in or placed in by hand and the outer layer rolled up around it, and no glue may be necessary to retain it in place. When glue is applied, it may be sprayed on by a crude atomizer. Where there are portions of the body that need additional padding, the padding 33 will be made thicker, as at 34.

Figure 29:
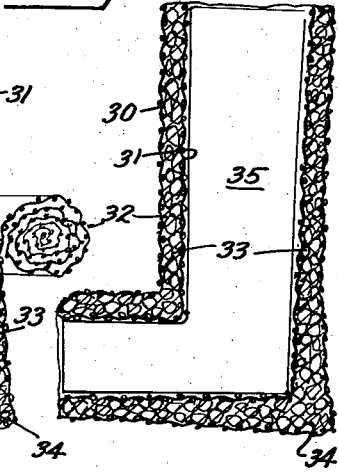

After the padding 33 has been applied and the outer layer 32 of fabric has been rolled over the inner layer 31, enclosing the padding material 33 between the two layers 31, 32, the prefabricated pad 30 is completed (FIG. 29). It may be removed from the form 35 on which it was made by rolling it off as a stocking might be rolled off. It then appears as in FIG. 30 and is ready to be applied to the human part or to be packaged for shipment.

Figure 30:
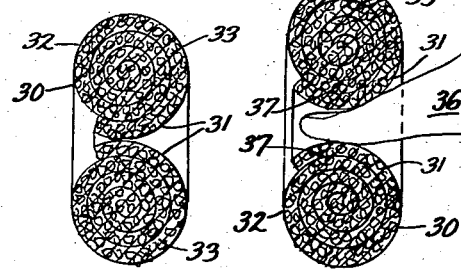
Figure 31:
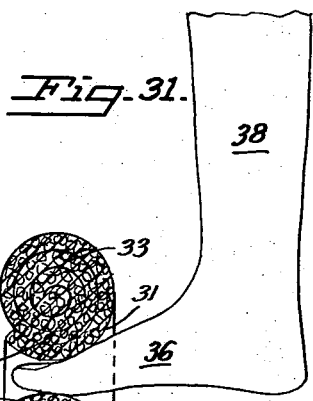

As shown in FIG. 31, the article 30 of FIG. 30 may be stretched out somewhat at the opening, so that it will fit around at foot 36. The inner sides of the roll are then somewhat compressed, as FIG. 31 shows at 37.

Figure 32:
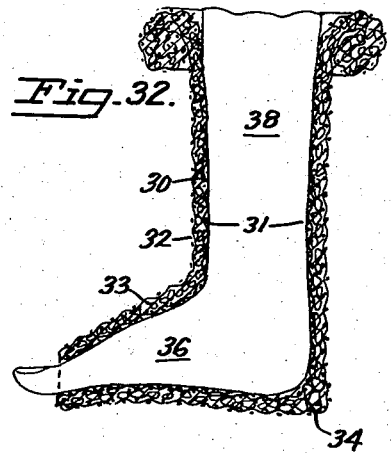

Then the pad 30 may be unrolled up the leg 38, appearing then as in FIG. 32.

*A Third Example of a Prefabricated Tubular Pad*

(FIGS. 5, 13 and 33)

FIG. 5 shows a further modified form of sleeve pad 40. Here there are three fabric tubes 41, 42 and 43 with two layers 44, 45 of padding, therebetween. A thickened portion 46 is shown. This figure illustrates how heavily padded sleeves may be built up, with any distribution of the padding material required. The layers may be built up with even thickness of padding all over or with the thickness varied as may be desired in special layers or special areas.

FIG. 13 illustrates, in an enlarged view, how a portion of a pad with three fabric layers may look. This may be the pad 40, or it may be a flat pad. Here, the two outer layers 10 and 12 are knit fabric, and the inner layer 11 is coarse netting. A layer 13 of padding particles is lightly glued to the netting 11 and covered with the knit fabric 10. A similar layer 14 of padding particles is similarly lightly glued to the other side of the netting 11 and covered with the knit fabric 12. The glue 15 may be lightly applied to the net 11 as droplets, and the particles for the layers 13 and 14 sifted on. Some of them will stick to each other also, but this is not bad, so long as there is little glue and no homogeneous mass is formed. Also, the glue 15 should be applied sparingly to the net 12 because too much glue causes the threads to become stiff and interferes with the ready stretchability of the article.

As this view illustrates, the fabric layers 10, 11, and 12 are stretchable, and the layers 13 and 14 of discrete particles can move apart from each other or get closer together or compress against each other to follow the fabric.

FIG. 33 shows how a similar pad can be built up from a net 11 and knit fabric 10 and 12 by using loose cotton batting as the padding material. The sheets 18, 19 of batting are not, in this illustration, glued or adhesively secured to the net's threads, but they are intermingled with the threads of the net 11 so that they necessarily move with the net 11—stretching out in the direction the net is stretched and compressing in the direction in which the net contracts.

*Example of a Flat Pad*

(FIGS. 6-7)

FIGS. 6 and 7 show a flat pad 50 made from a stretchy fabric base 51 and particles 52 of padding material. The padding has been built up thickly along the edges 53 and in a central portion 54 to show what can be done, although the padding thickness may be varied in other manners. The pad 50 may be applied around or over any body portion. It may be covered directly with plaster at the time of application, or it may be covered with a separate plaster cast.

The flat prefabricated pad 50 may be constructed by placing the fabric base 51 on a flat surface and then applying the particles 52 to it. Where there is only one layer of fabric 51, the particles 52 may be lightly glued to it, adhering them to the fabric 51, in discrete spots and not to each other, or they may be merely pressed into the fabric. The pad 50 may then be rolled, a piece of paper preferably being placed between the layers so that the padding material 52 will not tend to adhere to itself and come off from the fabric 51.

Where two layers of fabric are to be used, the particles may be put on the first layer and the second layer spread on top of it. The resultant pad may then be rolled like a jelly-roll to retain the particles in place. Additional layers may be applied in the same general manner (compare with FIG. 13), the layers of fabric being fastened together by a rubber cement or adhesive material at discrete spots, or by sewing them together with elastic thread or with a tie thread, or by quilting the pad in areas. The pad will still keep its general ability to be stretched in one direction at the expense of the other direction.

My prefabricated pad may be made in any shape to fit any part of the body or the entire body. Usually, a few simple rectangular sheets or tubes are plenty to accommodate almost all cases.

*Example of Tubular Pad Made from Flat Pad with Glued Edges*

(FIGS. 8-11)

FIGS. 8-11 illustrate the formation of a tubular pad 60 from two flat, prefabricated pieces 61 and 62 of padded material. The piece 61 (FIGS. 8 and 9) has a layer 63 of padding between two layers 64 and 65 of fabric, stitches 79 holding the layers 64 and 65 together. The edges 66 and 67 are beveled, and strip areas of discrete spots of glue 68 and 69 are applied thereto.

The piece 62 (FIG. 10) is prepared similarly, the padding 70 being held between two layers 71, 72 of fabric and the edges 73, 74 being beveled. In this case, however, the glue 75, 76 is applied below the base 71, rather than above it, as in FIG. 9. In FIG. 11, the two pieces 61 and 62 have been glued together, the strips 68, 75 of glue facing each other, and the strips 69, 76 also facing each other. Safety pins 77, 78 may help hold the sleeve together at least until the glue dries. When proper fabric and padding materials are used, the pieces 61, 62 may be stretched and otherwise manipulated either before or after they are joined, and they may be joined either before or at the time of application.

*Example of a Unitary Pad for the Entire Lower Portion of the Body*

(FIGS. 22-24)

FIGS. 22-24 show the use of a single flat prefabricated pad unit 90 in padding the lower half of a patient's body 91, and the legs 92, 93. The unit 90 may, when produced and when unwrapped (sterile) by the doctor appear as in FIG. 22. The outer edges 94, 95 may be beveled with glue 96 applied thereon, on opposite sides. The split 97 extends up from the lower edge of the cast, and the edges 98, 99 may be similarly beveled or glued or both.

The first thing to be done is to stretch the unit 90, mainly lengthwise, to correspond it generally to the shape of the patient, who may then be placed thereon, as in FIG. 23. Then the pad 90 may be conformed around the body 91 and around the legs 92, 93, using additional stretching where necessary, and secured together by glue, as shown, or in other ways, as by safety pins or adhesive tape.

*Example of Pad Applied with Cast to the Entire Lower Portion of the Body*

(FIG. 25)

The pad of this invention need not be held together by glue. It can be held together by the cast which surrounds it. Also, the pad of this invention is well adapted for use along with my prefabricated stretchy cast, described and claimed in application Serial Number 325,001, referred to before.

FIG. 25 illustrates the principle. A pad 100, resembling the pad 90 except that it has no glue, is to be applied to the body 91 and legs 92, 93 of a patient. At the same time, a cast 101, of the prefabricated stretchy type of Serial No. 325,001 is also to be applied.

Since both the pad 100 and cast-forming article are stretchy and conformable, they cooperate well together. After the cast-forming article 101 has been moistened and worked, the pad 100 is placed over it, and the two may be stretched together to the proper shape. Or the cast-forming article 101 may be stretched out first and the pad 100 stretched out to the same shape and placed over it. Then the patient may be laid over the pad 100.

The pad 100 is conformed around the patient and overlapped slightly; then the cast 101 is conformed therearound and it holds itself together and also holds the pad 100 together. The work proceeds almost simultaneously, overlapping a portion of the pad, overlapping a portion of the cast, and so on until the work is completed. The work may be done even more quickly if two persons work together, one overlapping the pad 100 and the other following up with the cast 101.

*Example of Cooperation Between Padding and Plaster*

(FIG. 12)

FIG. 12 shows how the padding and plaster may be combined to give a cast 80 having a substantially uniform thickness. The innermost fabric layer 81 holds a stretchy base of padding 82. At the ends 83, 84 the entire thickness of the cast 80 is occupied by padding 82, so that there is no roughness along the edges to hurt the skin if swelling takes place. For illustrative purposes, heavy padding is also provided at 85 and 86, as it would be if it were necessary to take care of some bony prominences. In between the edges 83, 84 and the heavy portions 85, 86 the padding 82 is relatively thin. Plaster 87 is placed over the padding 82 up to a substantially constant total thickness.

*Use of Padding in Making a Cast That Can Be Quickly Taken Apart*

(FIG. 26)

Figure 26:
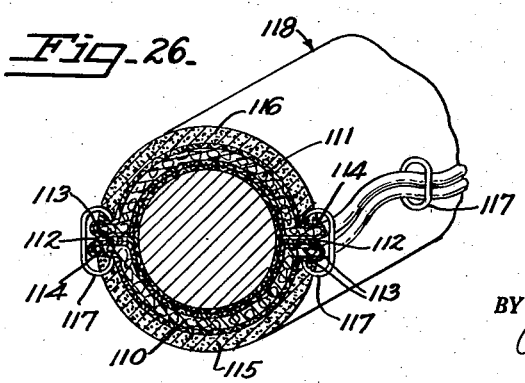
FIG. 26 is a view in perspective and in section of a two-piece tubular pad of this invention with outwardly turned flanges glued together and with a cast thereabout, the padding flanges separating the cast into two portions, so that it is possible to take the cast apart readily.

In Patent No. 2,761,443, I describe and claim seamed casts. A similar result can be achieved by using my novel prefabricated pads in combination with plaster cast segments. This is illustrated in FIG. 26.

Here, two flat prefabricated pads 110, 111 provided with discrete spots of glue 112 along their edges 113 have been joined together, with the edges 113 extending radially outward to form a seam-like projection 114. A pair of flat cast-forming articles 115, 116 (like those of Ser. No. 325,001) are placed therearound, but are prevented from meeting by the seam 114.

The cast sections 115, 116 are held together by being held to the pads 110, 111, which are glued together, and also by pigrings 117 (or clamps or other securing means). The cast will be a unitary padded cast 118 when it hardens, but it can be taken apart without using plaster cutters by taking out the pigrings 117 (or other securing means) and pulling apart the seam 114. The cast 118 can be put back together by regluing the seam 114 and reapplying the pigrings 117.

*Comments on the Application and Storage of Pads*

(FIGS. 25 and 26)

Tubular pads may be shipped rolled like a rolled stocking and unrolled onto the human part at the time of use, like the pad 30. Or the pads may be unrolled before shipment around some form more or less simulating a human part, and shipped on this form. Before use they may be rolled up again.

Non-tubular or flat prefabricated pads or dressings may be rolled tight like a jelly-roll at the time of shipment, and kept that way until the time when they are applied by unrolling over the human part.

*Control of Stretch*

Some materials from which the cloth skeleton 10 may be made are too stretchy—they tend to elongate too far when pulled. This may be the case with very loose weaves, very wide-mesh netting, very loose knit material, and material having very extensible elastic threads. These materials may have other desirable characteristics: their threads may be strong, they may be inexpensive, and so on.

I have found that it is possible to use these excessively extensible materials in multi-layer skeletons by pre-stretching some layers in one direction and some in another direction. By pre-stretching one layer lengthwise (for example) up to the point where only the desired amount of stretch remains in that layer, the extensibility of the pad itself is limited to that amount. Another layer may be pre-stretched widthwise up to the point where only the desired widthwise stretch remains, and then the pad is limited in stretch both widthwise and lengthwise. The layer that was pre-stretched lengthwise would, by itself, be excessively elongatable widthwise, but it is restrained by the layer that was pre-stretched widthwise, and vice versa.

Instead of pre-stretching, control of stretch may be obtained by incorporating inextensible or less extensible members in one or more directions. These control means are sometimes more desirable and sometimes less desirable than the pre-stretching means described.

Examples of these different ways of controlling stretch appear in FIGS. 39–42.

Figure 39:
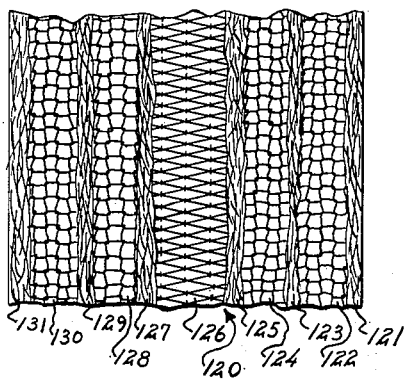
FIG. 39 is a top plan view of a pad, somewhat diagrammatic in nature and with each successive layer broken away, showing how one layer of net may be pre-stretched to limit the extendability of the pad in one direction.

The pad 120 of FIG. 39 includes, reading from right to left and also from the bottom up, a first layer 121 of padding material, a first layer 122 of loosely knit cloth fabric in unstretched, neutral position; a second padding layer 123, a second knit layer 124, also unstretched; a third padding layer 125, a layer 126 of coarse netting, pre-stretched along the direction parallel to the top of the page, so that little stretch remains in that direction; a fourth padding layer 127, a third knit layer 128, a fifth padding layer 129; a fourth knit layer 130, and a sixth padding layer 131. Although only the netting 126 is pre-stretched or pre-extended, it controls the entire cast 120, and the stretch of the pad 120 in one direction is limited to the amount of extension of which the net 126 is capable.

Figure 40:
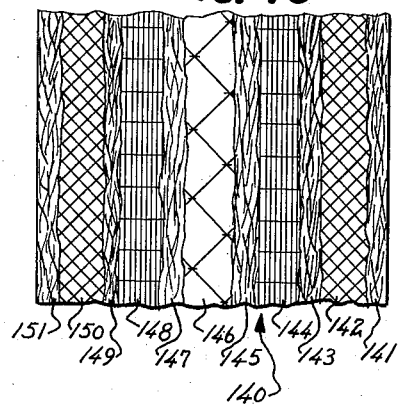
FIG. 40 is a view similar to FIG. 39 of another pad having two knit layers both pre-stretched in the same direction to limit the extensibility of the pad.

The pad 140 of FIG. 40 comprises: a bottom layer 141 of padding material, such as entangled cotton batting, a first layer 142 of undistorted, unstretched, loosely woven cloth in its neutral position, a second layer 143 of padding; a first layer 144 of pre-stretched knit fabric; a third padding layer 145; a layer 146 of undistorted, unstretched netting; a fourth padding layer 147; a second pre-stretched knit fabric layer 148; a fifth padding layer 149; a second undistorted loosely woven cloth 150; and a sixth padding layer 151. Here, as in FIG. 39, there are five layers of cloth, but there could be more or fewer layers. Here, also, as always, the netting 147 and the loosely-woven layers 142 and 150 are placed on the bias. Although the netting 147 is capable of great extension in either direction, the extensibility of the pad 140 has been limited by the pre-stretch of the knit layers 144 and 148. Here both layers 144 and 148 were prestretched in the same direction, but if a limitation of stretch in both directions is desired, one could be stretched one way and the other one normal thereto.

Figure 41:
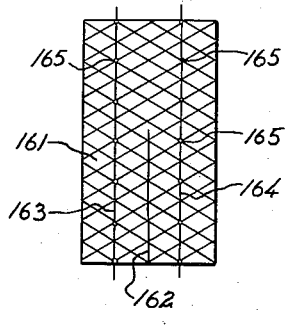
FIG. 41 is a top plan view of one layer of a cloth skeleton of a pad showing inextensible cords to limit stretch lengthwise.

FIG. 41 shows only one layer 160 of the cloth skeleton of a pad, resting on a padding layer 161. The pad is slit part way up the middle at 162. Two inextensible cords 163, 164 extend lengthwise and are knotted at intervals to the skeleton 160 by knots 165. Extension can therefore take place only in the direction perpendicular to the cords 163, 164. The knotting is not essential, but helps.

Figure 42:
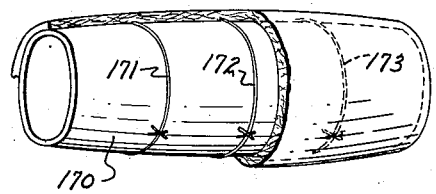
FIG. 42 is a side view in perspective, partly broken away and partly in section showing a tubular pad with inextensible cords used to limit the stretch circumferentially.

FIG. 42 shows a tubular pad 170 in the center of which are incorporated a few inextensible cord loops 171, 172, 173, to limit the circumferential extension of the pad 170. Some stretch can be provided by wrinkling or sinuating the cords.

Any cotton batting which has most of its fibers arranged generally parallel to one major dimension can be extended with ease in the dimension parallel to the fibers but will not be extended in the dimension at right angles to the fibers. An example of this material is Webril of The Kendall Company. When this sheet batting material, which has great extensibility in one dimension with none in the other dimension, is combined with the very extensible fabrics, the batting limits stretch in one dimension but not in the other dimension. This one-way extensible sheet batting material may be combined with any desired amount of prestretching of the extendible fabrics as at 130, 126, and 148 in FIGS. 39 and 40.

*Another Example of How a Pad of this Invention May be Made*

Lint cotton, which is in particles of different sizes all the way from pinhead size to around a quarter of an inch in size, is tied together and mixed in with a small amount, usually about 10% of longer cotton, generally known as comber. These two materials are mixed and rolled out into a batting of the thickness wanted. This batting of lint cotton tied together with some longer strands is in general the material going into lower type felts or cotton upholstering material.

To make the pads, sheets of batting may be placed between two layers of knit material. One layer of the knit material, which is stretched about three-fourths widthwise, is moistened with a sizing material, as explained above, and placed on a flat surface. Preferably, this flat surface has a release covering to keep the sizing material from sticking the knit fabric to the working surface. The cotton batting is then rolled out or spread out on the three-fourths stretched knit material. The upper side of the batting is then covered with three-fourths stretched knit material that has been treated with the wet sizing, the rib of the knit running a right angles to the rib of the lower piece of knit material. The pieces of knit material are turned so that the rib is on the inside next to the cotton batting, and the smoother side of the knit is on the other side, facing outside, where it may contact the patient. The rib of the knit material is on the outside of the tube at the time it is knit. By turning the rib next to the cotton more adherence is had and it gives the padding smoother surface on the outside.

The pad is then rolled or pressed so that the sizing material will somewhat adhere the cotton batting to the knit. The rolling may be done over a sheet that has release material in it, or the roller may have a release on it so that it will not stick to the damp, tacky sizing of the knit. After the pad is rolled, it is dried so that the sizing will be fixed. The sizing thus both fixes certain portions of the cotton to the net and stiffens the net somewhat so it will not have runaway stretch.

A preferred sizing material is polyvinyl acetate (e.g., Borden Chemical Company's Polyco No. 529) used in a 10% water solution. When the water dries out, the polyvinyl acetate forms a stiff film or sizing. About the same thing is used in many of the commercial plastic starches. Other types of glue or sizing may be used, as described earlier.

Any variation of stretch may be used. If the two nets are fully stretched and then put at right angles to each other, little stretch would be left. At three-fourths stretch there is still enough stretch to make them mold and adjust and still fracture the cotton. They may be at or near half-stretch and still be practical.

In addition to the cotton particles or padding, small particles of foam padding, foam rubber, and foam plastic may be combined in the padding.

Light concentrations of sizing on these knit materials may require somewhat more force to stretch the material but they do not stop the stretch.

The above examples illustrate that any desired relation between padding and plaster is possible as a result of the present invention. Prior art has used stretchy tubular material in building paddings or dressings piece by piece. Prior art has also used elastic material as a bandaging material which was wound on to give an elastic effect. However, my invention is distinct from these because it combines the padding material directly with the fabric and gives the padding or dressing a stretchy but inelastic quality. Furthermore, this invention contemplates making totally prefabricated pads or garments which can be put on and adjusted as to fit because of this characteristic stretchy effect—that is the pad unit extends in one major dimension at the expense of simultaneous contraction in the other mutually perpendicular major dimension, and can be pulled back and forth to produce major changes in shape, without fracture.

My invention of a prefabricated pad is also useful as part of a complete cast, whether the cast is prefabricated or not and whether the padding and cast are stretchable at the time of application or not.

To those skilled in the art to which this invention relates, many changes in construction and widely differing embodiments and applications of the invention as defined in the claims will suggest themselves without departing from the spirit and scope of the invention. The disclosures and the description herein are purely illustrative and are not intended to be in any sense limiting.

I claim:

1. A prefabricated article for incorporation under surgical casts and molds and the like, said article comprising, in combination, a plurality of superimposed concentrically disposed seamless, tubular layers of loosely knit cotton cloth, each layer of cloth being formed of intercoupled threads in coacting relationship with each other, with certain threads intersecting other threads at juncture points forming oblique angles and defining open interstices therebetween, with the distance between adjacent juncture points along any thread being greater than the diameter of any of the threads, so that when pulled the layers of cloth will deform without stretching the intercoupled threads by having the juncture points which are generally aligned to the direction of pull separating a substantial amount in relation to each other and the juncture points which are generally aligned transversely to the direction of pull converging a substantial amount in relation to each other, said cloth being extendable at least 25% in each direction, said knit cloth having ribbing facing inwardly toward the ribbing of another layer of knit cloth, said threads being coated with polyvinyl acetate to prevent runaway stretch, and cotton batting between each pair of layers fixed to said knit cloth partly by said sizing and partly by engagement with said ribbing, whereby said article can be extended widthwise and placed as a tube around a solid body that extends through said tube and can then be extended lengthwise to fit snugly around said body, a smooth and even conformation being obtained by working the article into shape by virtue of the deformable nature in every portion thereof and by virtue of its ability to hold a shape to which it is deformed without being under substantial tension.

2. A prefabricated article for incorporation under casts and molds and the like, said article comprising, in combination, a plurality of superimposed layers of loosely knit cloth, each layer of cloth having certain threads in coacting relationship with other threads which intersect said certain threads at juncture points defining open interstices therebetween with the distance between adjacent juncture points along any thread being greater than the diameter of any of the threads, the threads being slidable on each other at the juncture points so that when pulled the layers of cloth will deform without stretching the threads by having the juncture points which are generally aligned to the direction of pull separating a substantial amount in relation to each other and the juncture points which are generally aligned transversely to the direction of pull converging a substantial amount in relation to each other by virtue of their sliding, said cloth being extendable at least 25% in each direction from a neutral position, and soft, cushiony, compressible padding material carried between said layers and stretchable with them without fracture.

3. A prefabricated article for incorporation under surgical casts and molds and the like, said article comprising, in combination, at least one layer of loosely constituted cloth, said layer being formed of inter-coupled threads in coacting relationship with each other with certain threads intersecting other threads at juncture points and defining open interstices therebetween with the distance between adjacent juncture points along any thread being greater than the diameter of any of the threads, so that when pulled the cloth will deform without substantially stretching the individual threads, by having the juncture points generally aligned to the direction of pull separating a substantial amount in relation to each other and juncture points generally aligned transversely to the direction of pull converging a substantial amount in relation to each other, said cloth being extendable at least 25% in each said direction from a neutral position; and soft, cushiony, compressible padding material carried by said layer and entangled at least partially therewith, whereby said article can be deformed in either said direction and conformed to a body by said deformation to fit snugly thereon, a smooth and even conformation being obtained by working the article into shape by virtue of the deformable nature in every portion thereof and by virtue of the ability to hold such deformed shape without being under substantial tension.

4. A prefabricated pad for use with a surgical cast or mold or the like, comprising, in combination, a fabric having certain threads extending substantially parallel to one of the major dimensions of the fabric and in coacting relationship with other threads extending substantially transverse thereto which intersect said certain threads at juncture points defining open interstices therebetween with the distance between adjacent juncture points along any thread being greater than the diameter of any of the threads and with the juncture points which are disposed in rows generally aligned with said certain threads separating a substantial amount in relation to each other in response to a pull being exerted on the fabric and the juncture points disposed in rows generally aligned with the other threads converging a substantial amount in relation to each other thus extending the interstices in the general direction of such pull and contracting the interstices transversely thereto to effectively deform said fabric without materially stretching the threads; and a soft, cushiony, compressible padding material carried by said fabric and extensible therewith, said material moving partly with said threads and juncture points instead of fracturing and therewith conformable to an irregular object about which said article is placed prior to application of a cast or mold.

5. A surgical cast and the like, including in combination: a unitary pad composed of at least one layer of loosely constituted thread type cloth, said cloth thereby being capable of a substantial amount of distortion along the major dimensions of the base, elongation in one direction being at the expense of contraction in the direction normal thereto, and soft, cushiony, compressible padding material packed on one side of said layer and united therewith, said padding varying in thickness over said article; and an outer layer of cast-forming material adhered to said padded article and thicker where the padding is thinner, so that the cast has a generally uniform total thickness.

6. A tubular surgical cast and the like, comprising two unitary pads, each comprising soft-compressible material held between layers of stretchable, loosely-constituted thread-type cloth, said pads being secured together by glue at their edges, said edges being radially out turned to form a pair of seam flanges; a pair of cast sections adhered to the outside of said pad and separated solely by said seam flanges; and joining means extending across said seam flanges and joining said cast sections firmly together.

7. A method for applying to a patient non-fracturable stretchable padding in sheet form and wet stretchable plaster of Paris-impregnated fabric so as to make a padded rigid plaster cast, comprising the steps of stretching said wet plaster of Paris-impregnated fabric over a flat surface to conform it to an approximate shape; conforming said pad to said shape over said fabric, by stretch; laying the patient over said pad; conforming said pad to said patient by stretching it around a body portion of said patient conforming said fabric around said pad, by stretching it, the plaster of Paris thereof joining and forming a continuous tube and holding said pad in place; and setting said plaster of Paris.

8. A padded article, comprising, in combination, a plurality of fabric layers, each having certain threads in coacting relationship with other threads which intersect said certain threads at juncture points defining open interstices therebetween with the distance between adjacent juncture points along any thread being greater than the diameter of any of the threads, the threads being slidable on each other at the juncture points, so that when pulled the layer of cloth will deform by having the juncture points that are aligned in the general direction of a pull exerted on the fabric separating a substantial amount and the juncture points generally aligned transversely thereto converging to effectively deform said fabric without materially stretching the threads, the cloth threads in one layer being disposed with the juncture points aligned along one direction in a substantially three-quarter extended position to their maximum distance apart, the threads in another layer being similarly disposed but placed at right angles to said one layer, so that said article has limited stretch in each direction; and soft cushiony padding material carried by at least one said fabric layer and extensible therewith and contractable therewith.

9. The article of claim 8 wherein the stated disposition of said threads comprises a pre-stretching of said fabric in said one direction.

10. The article of claim 8 wherein some of said layers are loosely knit cloth and some of said layers are coarse netting, said netting being placed on a bias relative to said knit cloth.

11. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material on one side of said layer, adhered to portions of said cloth and consequently distortable along with said cloth to the same degree and without fracture, said padding material consisting of extensible and compressible inelastic sheets of material glued to said cloth at a multiplicity of discrete portions, so that the shape of said padding material conforms to that of the fabric, following its expansion and contracting in a direction normal to the direction in which the cloth is pulled, said sheets being made from loosely fabricated material crinkled in one direction, its crinkling permitting its extension in a direction normal thereto without fracture with the result that it becomes crinkled in the other direction.

12. A prefabricated article for incorporation under a surgical cast and the like, as for padding and dressing, including in combination: a fabric skeleton composed of at least one layer of loosely constiuted thread type cloth, the threads being arranged to enable at least 25% extension along the major dimensions of the skeleton, elongation in one direction being at the expense of contraction in the direction normal thereto and being recoverable; and soft, cushiony, compressible padding material on one side of said layer, adhered to portions of said cloth and consequently distortable along with said cloth to the same degree and without fracture, said padding material consisting of extensible and compressible inelastic sheets of material glued to said cloth at a multiplicity of discrete portions, so that the shape of said padding material conforms to that of the fabric, following its expansion and contracting in a direction normal to the direction in which the cloth is pulled, said sheets being made from loosely fabricated crinkled paper, its crinkling permitting its extension without fracture until straightened.

13. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material on one side of said layer, adhered to portions of said cloth and consequently distortable along with said cloth to the same degree and without fracture, said padding material consisting of extensible and compressible inelastic sheets of material glued to said cloth at a multiplicity of discrete portions, so that the shape of said padding material conforms to that of the fabric, following its expansion and contracting in a direction normal to the direction in which the cloth is pulled, said sheets being made from loosely fabricated crinkled Cellucotton, its crinkling permitting its extension without fracture until straightened.

14. A prefabricated article for incorporation under a surgical cast and the like, as for padding and dressing, including in combination: a fabric skeleton composed of a plurality of layers of loosely constituted thread-type inelastic cloth, the threads being arranged to enable a substantial amount of distortion along the major dimensions of the skeleton, elongation in one direction being possible up to at least 25% and being at the expense of contraction in the direction normal thereto, said fabric retaining a shape to which it is formed until changed to a different shape in the same general manner, said skeleton consisting of outer layers of knit fabric and at least one inner layer of netting; and soft, cushiony, compressible padding material held to said inner layer of netting between said layers of knit fabric, so that said padding is distortable along with said fabric.

15. The article of claim 14 in which the padding comprises a large number of small particles lightly glued to the netting.

16. The article of claim 14 in which the padding comprises a sheet of cotton batting entangled with the meshes of the netting.

17. A prefabricated article for incorporation under a surgical cast and the like, as for padding and dressing, including in combination: a fabric skeleton composed of a plurality of layers of loosely constituted thread-type inelastic cloth, the threads being arranged to enable a substantial amount of distortion along the major dimensions of the skeleton, elongation in one direction being possible up to at least 25% and being at the expense of contraction in the direction normal thereto, said fabric retaining a shape to which it is formed until changed to a different shape in the same general manner; and soft, cushiony, compressible padding material held to said cloth between said layers, so that said padding is distortable along with said fabric, said article being tubular for encasing a limb and the like, the limb fitting inside the tube, having a tubular skeleton, with a fabric inner layer adapted to encircle a limb and the like.

18. A padded article, comprising, in combination, a fabric having certain threads in coacting relationship with other threads which slidably intersect said certain threads at juncture points defining open interstices therebetween with the distance between adjacent juncture points along any thread being greater than the diameter of any of the threads, the fabric being extensible a substantial amount in the general direction of a pull exerted on the fabric by the sliding of the threads at the juncture points and contractable transversely thereto to effectively deform said fabric without materially stretching the threads, said threads being covered by a generally waterproof coating and stiffening sizing material so as not to restrict their movement relative to each other, whereby their ability to respond to pull is substantially unaffected in the presence of water and drying of a cast around said article is not delayed by wet threads; and soft cushiony padding material carried by said fabric and extensible therewith and contractable therewith.

19. A padded article, comprising in combination a fabric having its threads individually coated with polyvinyl acetate and having certain threads in coacting relationship with other threads which slidably intersect said certain threads at juncture points defining open interstices therebetween with the distance between adjacent juncture points along any thread being greater than the diameter of any of the threads, the fabric being extensible a substantial amount in the general direction of a pull exerted on the fabric by the sliding of the threads at the juncture points and contractable transversely thereto to effectively deform said fabric without materially stretching the threads; and soft cushiony padding material carried by said fabric and extensible therewith and contractable therewith.

20. A padded article, comprising, in combination, a fabric having certain threads in coacting relationship with other threads which slidably intersect said certain threads at juncture points defining open interstices therebetween with the distance between adjacent juncture points along any thread being greater than the diameter of any of the threads, the fabric being extensible a substantial amount in the general direction of a pull exerted on the fabric by virtue of the sliding of the threads at the juncture points and contractable transversely thereto to effectively deform said fabric without materially stretching the threads; a plurality of inextensible members incorporated into said fabric along one direction to limit said stretch in said one direction; and soft cushiony padding material carried by said fabric and extensible therewith and contractable therewith.

21. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and a large number of small soft cushiony compressible padding material particles between about 1 mm. and about 1 cm. in diameter glued to one side of said layer at discrete spots thereon, whereby said padding is distortable along with said cloth to the same degree and without fracture by virtue of said particles' ability to be moved about and away from each other.

22. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material on one side of said layer, adhered to portions of said cloth and consequently distortable along with said cloth to the same degree and without fracture, said padding material consisting of extensible and compressible inelastic sheets of material glued to said cloth at a multiplicity of discrete portions, so that the shape of said padding material conforms to that of the fabric, following its expansion and contracting in a direction normal to the direction in which the cloth is pulled.

23. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material comprising a large number of small particles between about 1 mm. and 1 cm. in diameter, entangled in the meshes of the cloth, whereby said padding is distortable along with said cloth to the same degree and without fracture by virtue of said particles' ability to be moved about and away from each other but not away from said skeleton.

24. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; soft, cushiony, compressible padding material on one side of said layer; and by discrete spots of glue adhering said padding material to said cloth at many discrete spots so that said padding material is unattached between said spots and consequently distortable along with said cloth to the same degree and without fracture.

25. A padded article, comprising, in combination, a loosely knit cloth having a ribbed surface and a smoother surface, soft cushiony padding material carried by said cloth and extensible therewith and contractable therewith, said ribbed surface facing said padding material; and adhesive only on the ribs of said ribbed surface adhering only said ribs to said padding material.

26. The article of claim 24 wherein said padding material comprises cotton batting with most of its fibers arranged generally parallel to one major dimension.

27. A prefabricated article for incorporation under a surgical cast and the like, as for padding and dressing, including in combination: a generally rectangular fabric skeleton having longitudinal edges and composed of a plurality of layers of loosely constituted thread-type inelastic cloth, the threads being arranged to enable a substantial amount of distortion along the major dimensions of the skeleton, elongation in one direction being possible up to at least 25% and being at the expense of contraction in the direction normal thereto, said fabric retaining a shape to which it is formed until changed to a different shape in the same general manner, said skeleton having tacky material applied along said longitudinal edges on both sides thereof and soft, cushiony, compressible padding material held to said cloth between said layers, so that said padding is distortable along with said fabric.

28. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material comprising a large number of small particles between about 1 mm. and 1 cm. in diameter, entangled in the meshes of the cloth, whereby said padding is distortable along with said cloth to the same degree and without fracture by virtue of said particles' ability to be moved about and away from each other but not away from said skeleton, said particles of padding material being individually covered with a waterproof coating.

29. A prefabricated article for incorporation under a surgical cast and the like, as for padding and dressing, including in combination: a fabric skeleton composed of at least one layer of loosely constituted thread type cloth, the threads being arranged to enable at least 25% extension along the major dimensions of the skeleton, elongation in one direction being at the expense of contraction in the direction normal thereto and being recoverable; and soft, cushiony, compressible padding material on one side of said layer, adhered to portions of said cloth by discrete spots of glue and consequently distortable along with said cloth to the same degree and without fracture, said cloth being knit material with one side ribbed and facing the padding material, the ribs being the discrete spots adhered to the padding material.

30. A prefabricated article for incorporation under a surgical cast and the like, as for padding and dressing, including in combination: a single layer of loosely constituted thread type cloth, the threads being arranged to enable a substantial amount of distortion along the major dimensions of the skeleton, elongation in one direction being at the expense of contraction in the direction normal thereto, said cloth being inelastic so that it maintains the shape to which it has been reformed, rather than resuming its original shape; and soft, cushiony, compressible padding material on one side of said layer, adhered to said cloth at discrete spots thereon, said padding comprising cotton batting with most of its fibers arranged generally parallel to one major dimension and after adherence to said cloth being distortable along with said cloth, said cloth being loosely knit material having a ribbed surface and a smoother surface, the ribbed surface being next to the cotton batting and adhered thereto at the ribs, these comprising said discrete spots.

31. A prefabricated article for incorporation under a surgical cast and the like, as for padding and dressing, including in combination: a single layer of loosely constituted thread type cloth, the threads being arranged to enable a substantial amount of distortion along the major dimensions of the skeleton, elongation in one direction being at the expense of contraction in the direction normal thereto, said cloth being inelastic so that it maintains the shape to which it has been reformed, rather than resuming its original shape; and soft, cushiony, compressible padding material on one side of said layer, adhered to said cloth at discrete spots thereon, said padding after adherence to said cloth being distortable along with said cloth, said cloth being loosely knit material having a ribbed surface and a smoother surface, the ribbed surface being next to the padding material and adhered thereto at the ribs, these comprising said discrete spots.

References Cited in the file of this patent

UNITED STATES PATENTS

| 4,099 | Goodyear | July 5, 1845 |
|---|---|---|
| 28,456 | Day | May 29, 1860 |
| 1,003,161 | Teufel | Sept. 12, 1911 |
| 1,930,030 | Anderson | Oct. 10, 1933 |
| 2,184,772 | Vamos | Dec. 26, 1939 |
| 2,213,290 | Rowe | Sept. 3, 1940 |
| 2,353,525 | Teague | July 11, 1944 |
| 2,528,129 | Francis | Oct. 31, 1950 |
| 2,533,976 | Teague | Dec. 12, 1950 |
| 2,628,928 | Cadous | Feb. 17, 1953 |
| 2,641,761 | Schultz | June 16, 1953 |
| 2,648,619 | Alderfer | Aug. 11, 1953 |
| 2,690,415 | Shuler | Sept. 28, 1954 |
| 2,705,497 | Johnson et al. | Apr. 5, 1955 |
| 2,774,127 | Secrist | Dec. 18, 1956 |
| 2,777,779 | Harwood et al. | Jan. 15, 1957 |
| 2,902,038 | Bletzinger et al. | Sept. 1, 1959 |

FOREIGN PATENTS

| 315,491 | Great Britain | July 18, 1929 |
|---|---|---|
| 602,653 | Germany | Sept. 13, 1934 |
| 548,949 | Great Britain | Oct. 30, 1942 |